United States Patent
Hotta et al.

(10) Patent No.: US 11,761,106 B2
(45) Date of Patent: Sep. 19, 2023

(54) METHOD FOR PRODUCING BLACK PLATED RESIN PART

(71) Applicant: TOYODA GOSEI CO., LTD., Kiyosu (JP)

(72) Inventors: Yuji Hotta, Kiyosu (JP); Koji Nakatani, Kiyosu (JP); Hiroaki Ono, Kiyosu (JP); Shiho Fujii, Kiyosu (JP); Noritake Isomura, Nagakute (JP)

(73) Assignee: TOYODA GOSEI CO., LTD., Aichi-pref. (JP)

(*) Notice: Subject to any disclaimer, the term of this patent is extended or adjusted under 35 U.S.C. 154(b) by 129 days.

(21) Appl. No.: 17/384,552

(22) Filed: Jul. 23, 2021

(65) Prior Publication Data
US 2021/0347150 A1    Nov. 11, 2021

Related U.S. Application Data

(62) Division of application No. 16/550,552, filed on Aug. 26, 2019, now Pat. No. 11,198,944.

(30) Foreign Application Priority Data

Sep. 26, 2018 (JP) .................. 2018-179682
Mar. 28, 2019 (JP) .................. 2019-062297

(51) Int. Cl.
*B32B 15/04* (2006.01)
*C25D 5/14* (2006.01)
(Continued)

(52) U.S. Cl.
CPC .............. *C25D 3/06* (2013.01); *B32B 15/043* (2013.01); *B32B 15/082* (2013.01);
(Continued)

(58) Field of Classification Search
None
See application file for complete search history.

(56) References Cited

U.S. PATENT DOCUMENTS

| 4,196,062 A | 4/1980 | Barclay et al. |
| 2017/0096113 A1 | 4/2017 | Hotta et al. |
| 2018/0266008 A1* | 9/2018 | Konigshofen ......... C25D 21/06 |

FOREIGN PATENT DOCUMENTS

| JP | S60-030754 B2 | 7/1985 |
| JP | 2014-513214 A | 5/2014 |

(Continued)

OTHER PUBLICATIONS

Office Action dated Jul. 6, 2021, issued in corresponding CN Patent Application No. 201910916928.7 (and English Machine Translation).

(Continued)

*Primary Examiner* — Seth Dumbris
(74) *Attorney, Agent, or Firm* — POSZ LAW GROUP, PLC

(57) ABSTRACT

A method for producing a black plated resin part includes the steps of electroplating a resin substrate provided with an underlying plating layer in a trivalent chromium plating bath containing thiocyanic acid, to thereby form, on the underlying plating layer, a black chromium plating layer composed of trivalent chromium and having a thickness of 0.15 μm or more; and immersing the resin substrate provided with the black chromium plating layer in warm water at 30° C. or higher for a predetermined time. In the method, the amount of thiocyanic acid contained in the trivalent chromium plating bath, the temperature of the warm water, and the time of immersion of the resin substrate in the warm water are adjusted so that the black chromium plating layer exhibits a b* value of −1.7 or less based on the L*a*b* color system.

2 Claims, 3 Drawing Sheets

(51) Int. Cl.
  *C25D 3/06*     (2006.01)
  *B32B 15/082*   (2006.01)
  *C23C 18/16*    (2006.01)
  *C25D 5/00*     (2006.01)
  *B60R 13/00*    (2006.01)

(52) U.S. Cl.
  CPC ............ *C23C 18/1633* (2013.01); *C25D 5/14* (2013.01); *C25D 5/623* (2020.08); *C25D 5/627* (2020.08); *B32B 2250/05* (2013.01); *B32B 2311/12* (2013.01); *B32B 2311/22* (2013.01); *B32B 2605/00* (2013.01); *B60R 13/00* (2013.01)

(56) References Cited

FOREIGN PATENT DOCUMENTS

| | | |
|---|---|---|
| JP | 2017-071100 A | 4/2017 |
| WO | 2012/150198 A2 | 11/2012 |

OTHER PUBLICATIONS

Office Action dated Oct. 19, 2021, issued in corresponding JP Patent Application No. 2021-001325 (and English Machine Translation).

* cited by examiner

METHOD FOR PRODUCING BLACK PLATED RESIN PART

CROSS REFERENCE TO RELATED APPLICATIONS

The present application is a divisional application of U.S. Utility application Ser. No. 16/550,552 filed on Aug. 26, 2019 which claims the benefit of priority from Japanese Patent Application No. 2018-179682 filed on Sep. 26, 2018 and Japanese Patent Application No. 2019-062297 filed on Mar. 28, 2019. The entire disclosures of all of the above applications are incorporated herein by reference.

TECHNICAL FIELD

The present invention relates to a method for producing a black plated resin part used in, for example, a decorative part for a vehicle or a housing for an electrical product.

BACKGROUND

In the field of, for example, a decorative part for a vehicle or a housing for an electrical product, an increasing demand has arisen for a deep jet-black appearance from the viewpoints of, for example, design. A jet-black color can be achieved by a black plating layer formed through, for example, cobalt chromium plating or chromium plating.

Jet-black color tones include a yellowish tone, a bluish tone, and a tone that is neither yellowish nor bluish. A commercial demand has arisen for a jet-black color tone that is not yellowish. The present applicant has previously focused on a problem that the jet-black color of a black plating layer formed of trivalent chromium looks yellowish when the black plating layer is seen through a chromate film (i.e., a corrosion-resistant film) formed on the black plating layer, and has shown that such a yellowish tone can be reduced by forming the corrosion-resistant film from chromium phosphate or molybdenum phosphate (Patent Document 1).

As described in Example 1 of Patent Document 1, the color of the black chromium plating layer seen through the corrosion-resistant film is expressed by an L* value of 52.46, an a* value of 0.67, and a b* value of 4.38 based on the L*a*b* color system, and the black chromium plating layer looks barely yellowish. However, a commercial demand has arisen for a black color with further reduced yellowish color tone.

PATENT DOCUMENTS

[Patent Document 1] Japanese Patent Application Publication No. 2017-071100

SUMMARY

Thus, an object of the present invention is to provide a black plated resin part including a non-yellowish and bluish black chromium plating layer formed of trivalent chromium.

The present inventors have conducted extensive studies, and as a result have found that the form of chromium present in a surface region of a black chromium plating layer formed of trivalent chromium affects a yellowish black color. The present invention has been accomplished on the basis of this finding.

[1] Plated Resin Part

A black plated resin part including a resin substrate, an underlying plating layer formed on the resin substrate, and a black chromium plating layer formed of trivalent chromium and having a thickness of 0.15 μm or more, the black chromium plating layer being formed on the underlying plating layer, wherein:

the chromium in the black chromium plating layer is present in the form of metallic chromium, chromium oxide, and chromium hydroxide, and the black chromium plating layer exhibits a b* value of 3.0 or less based on the L*a*b* color system.

In a surface region of the black chromium plating layer having a depth of at least 23 nm as measured from the surface of the black chromium plating layer, the compositional proportions of metallic chromium, chromium oxide, and chromium hydroxide preferably satisfy the following relations: b+c>4a and c>0.8b wherein a, b, and c represent the compositional proportions of metallic chromium, chromium oxide, and chromium hydroxide, respectively (note: a>0, b>0, and c>0).

The b* value is preferably −1.7 or less.

[Effects]

When the black chromium plating layer has a thickness of 0.15 μm or more, it can sufficiently conceal the underlying plating layer, to thereby achieve a jet-black color.

The chromium in the black chromium plating layer is present in the form of metallic chromium, chromium oxide, and chromium hydroxide, and the black chromium plating layer exhibits a b* value of 3.0 or less based on the L*a*b* color system. Thus, the black chromium plating layer does not look yellowish. The mechanism thereof has not yet been elucidated, but large amounts of chromium oxide and chromium hydroxide (in particular, chromium hydroxide) are probably the main cause for reducing a yellowish tone.

In particular, chromium hydroxide develops a bluish tone and reduces a yellowish tone, and thus the b* value of the black chromium plating layer can be reduced to −1.7 or less, to thereby achieve a bluish jet-black color that meets a recent commercial demand.

[2] Method for Producing Plated Resin Part

A method for producing a black plated resin part including a resin substrate, an underlying plating layer formed on the resin substrate, and a black chromium plating layer formed of trivalent chromium and formed on the underlying plating layer, the method including the steps of:

electroplating a resin substrate provided with an underlying plating layer in a trivalent chromium plating bath containing thiocyanic acid, to thereby form a black chromium plating layer on the underlying plating layer; and immersing the resin substrate provided with the black chromium plating layer in warm water at 30° C. or higher for a predetermined time, wherein the amount of thiocyanic acid contained in the trivalent chromium plating bath, the temperature of the warm water, and the time of immersion of the resin substrate in the warm water are adjusted so that the black chromium plating layer exhibits a b* value of −1.7 or less based on the L*a*b* color system.

[Effects]

The electroplating in the trivalent chromium plating bath containing thiocyanic acid leads to an increase in the amount of a chromium hydroxide precursor deposited in the black chromium plating layer. The immersion of the black chromium plating layer in warm water at 30° C. or higher for a predetermined time results in a structural change of the chromium hydroxide precursor in the black chromium plating layer into chromium hydroxide. Since the chromium hydroxide develops a bluish tone and reduces a yellowish tone, the b* value of the black chromium plating layer can be reduced to −1.7 or less.

The present invention can provide a black plated resin part including a non-yellowish and bluish black chromium plating layer formed of trivalent chromium.

DETAILED DESCRIPTION

1. Resin Substrate

Figure 1:
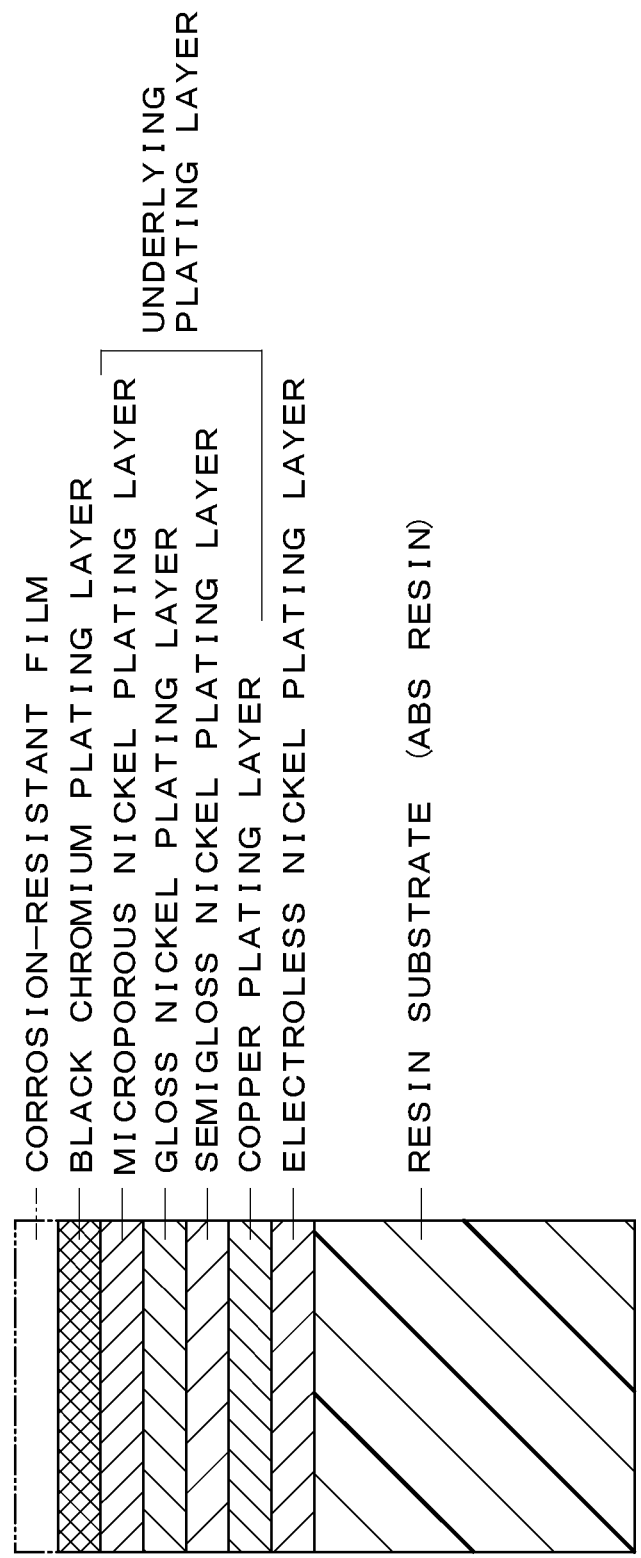
FIG. 1 is a schematic cross-sectional view of a black plated resin part of each of samples 1 to 21.

No particular limitation is imposed on the resin forming the resin substrate, and the resin substrate may be formed of a thermoplastic or thermosetting resin. Examples of the resin include an acrylonitrile-butadiene-styrene copolymer (ABS) resin, a polycarbonate (PC) resin, a PC/ABS resin, an acrylic resin, a styrene resin, a polyamide resin, a polypropylene resin, a vinyl chloride resin, and a polyurethane resin. The ABS resin or the PC/ABS resin is preferred from the viewpoints of, for example, strength and durability.

A conductive layer, which is necessary for electroplating of a subsequent underlying plating layer, is formed on the resin substrate. The conductive layer may be, for example, an electroless nickel plating layer, but is not particularly limited thereto.

2. Underlying Plating Layer

The underlying plating layer preferably includes a nickel plating layer, more preferably includes a copper plating layer and a nickel plating layer in this order. Preferably, the uppermost layer of the underlying plating layer is a nickel plating layer, and a black chromium plating layer is formed on the nickel plating layer. The copper plating layer has high ductility and thus conforms well to the resin substrate, and the nickel plating layer maintains a good appearance of the black chromium plating layer and electrochemically prevents corrosion of the black chromium plating layer. No particular limitation is imposed on the specific configuration of the nickel plating layer, and the nickel plating layer may be formed of a single layer or a plurality of layers.

3. Black Chromium Plating Layer

The thickness of the black chromium plating layer is adjusted to 0.15 μm or more as described above for sufficiently concealing the underlying plating layer, thereby achieving a jet-black color. No particular limitation is imposed on the upper limit of the thickness of the black chromium plating layer, but the upper limit is preferably 1 μm. A thickness of more than 1 μm causes an increase in the internal stress of the layer, resulting in easy breakage of the layer.

The surface region of the black chromium plating layer (i.e., a region having a depth of at least 23 nm as measured from the surface thereof) may be, for example, a region of a surface-modified layer formed by modification of the interior (matrix) of the black chromium plating layer, or the entire region of the black chromium plating layer. The surface-modified layer may be, for example, a layer formed by modification with warm water, oxygen, hydrogen, or water vapor.

[Color of Black Chromium Plating Layer Measured from Surface Region Side]

A b* value of 3.0 or less based on the L*a*b* color system leads to development of a non-yellowish black color, and a b* value of −1.7 or less leads to development of a slightly bluish black color, which meets a commercial demand. No particular limitation is imposed on the lower limit of the b* value. However, the lower limit is preferably −10, since a b* value of less than −10 leads to development of a strongly bluish black color, resulting in limited application of the black plated resin part.

No particular limitation is imposed on the a* value. However, the a* value is preferably −3 to 3, since an a* value of less than −3 leads to development of a strongly greenish black color, whereas an a* value of more than 3 leads to development of a strongly reddish black color, resulting in limited application of the black plated resin part.

No particular limitation is imposed on the L* value. However, the L* value is preferably 30 to 54, since an L* value of less than 30 leads to development of a strong black color with reduced metallic tone, whereas an L* value of more than 54 leads to development of a weak black color with reduced jet-black tone.

The black chromium plating layer preferably contains Fe in view of an improvement in corrosion resistance. The black chromium plating layer preferably contains Co, Mn, or Mo in terms of an improvement in adhesion of plating.

Examples of the trivalent chromium compound used in a trivalent chromium plating bath include, but are not particularly limited to, chromium sulfate ($Cr_2(SO_4)_3$), chromium alum ($CrK(SO_4)_2$), chromium nitrate ($Cr(NO_3)_3$), chromium chloride ($CrCl_3$), and chromium acetate ($Cr(CH_3COO)_3$).

4. Warm Water Immersion Treatment

The temperature of warm water is adjusted to 30° C. or higher as described above. The temperature is preferably 50° C. or higher, more preferably 60° C. or higher, most preferably 70° C. or higher, for the following reason. An increase in the temperature of warm water leads to promotion of the structural change of a chromium hydroxide precursor in the black chromium plating layer into chromium hydroxide.

5. Corrosion-Resistant Film

Preferably, a corrosion-resistant film is disposed on the black chromium plating layer. Examples of the corrosion-resistant film include a chromate film and a film formed of chromium phosphate or molybdenum phosphate disclosed in Patent Document 1. The film formed of chromium phosphate or molybdenum phosphate preferably has a thickness of 7 nm or more and 20 nm or less.

6. Application of Black Plated Resin Part

Examples of applications of the black plate resin part include decorative parts for vehicles (e.g., a radiator grill, a fender, a garnish, a wheel cap, a back panel, an air spoiler, and an emblem) and housings for electrical products (e.g., a cellular phone, a smartphone, a personal digital assistant, and a game machine). In particular, the present invention is more effectively applicable to a decorative part for a vehicle to be weathered, since the decorative part is required to have high corrosion resistance.

EXAMPLES

Samples 1 to 13, which have main differences shown in Table 1, were prepared as black plated resin parts shown in FIG. 1. The black chromium plating layer of each sample was subjected to analysis and color measurement.

TABLE 1

| Sample No. | Black chromium plating Amount of agent M added (mL/L) | Current density | Condition after black chromium plating | Surface-modified layer of black chromium plating layer Thickness (nm) | Metallic chromium (%) a | Chromium oxide (%) b | Chromium hydroxide (%) c | (b + c)/a | c/b | Color L* | a* | b* | Yellowish tone |
|---|---|---|---|---|---|---|---|---|---|---|---|---|---|
| 1 | 20 | High | Acceleration test | 37.7 | 4 | 50 | 46 | 24.00 | 0.92 | 43.5 | −0.02 | −1.63 | Absence |
| *2 | 20 | High | Storage under vacuum | 13.2 | 38 | 37 | 25 | 1.63 | 0.68 | 51.97 | 0.71 | 4.61 | Presence |
| *3 | 20 | High | Allowed to stand in air | 16.4 | 29 | 39 | 32 | 2.45 | 0.82 | 49.55 | 0.97 | 4.99 | Presence |
| 4 | 20 | High | Acceleration test | 25.5 | 12 | 47 | 41 | 7.33 | 0.87 | 45.22 | 1.03 | 1.84 | Absence |
| *5 | 30 | High | Storage under vacuum | 14.9 | 33 | 42 | 25 | 2.03 | 0.60 | 50.9 | 0.84 | 4.99 | Presence |
| *6 | 30 | High | Allowed to stand in air | 18.8 | 23 | 43 | 34 | 3.35 | 0.79 | 48.43 | 1.07 | 5.17 | Presence |
| 7 | 30 | High | Acceleration test | 30 | 7 | 50 | 43 | 13.29 | 0.86 | 44.17 | 0.84 | 0.4 | Absence |
| *8 | 30 | Low | Immediately after plating | — | 21 | — | — | — | — | 57.27 | 0.7 | 4.84 | Presence |
| *9 | 30 | Middle | Immediately after plating | 12.4 | 41 | 18 | 41 | 1.44 | 2.28 | 55.75 | 0.63 | 4.39 | Presence |
| *10 | 30 | High | Immediately after plating | 14.7 | 33 | 27 | 40 | 2.03 | 1.48 | 52.31 | 0.71 | 4.77 | Presence |
| *11 | 30 | Low | Acceleration test | — | 12 | — | — | — | — | 51.05 | 1.47 | 7.61 | Presence |
| *12 | 30 | Middle | Acceleration test | 15.7 | 31 | 28 | 41 | 2.23 | 1.46 | 52.07 | 0.92 | 4.97 | Presence |
| 13 | 30 | High | Acceleration test | 23.9 | 14 | 38 | 48 | 6.14 | 1.26 | 46.44 | 0.97 | 2.93 | Absence |

[Common Items of Samples 1 to 13]

As shown in FIG. 1, each of the black plated resin parts of samples 1 to 13 includes a resin substrate formed of ABS resin (provided with an electroless nickel plating layer serving as a conductive layer); an underlying plating layer formed on the resin substrate and including a copper plating layer, a semigloss nickel plating layer, a gloss nickel plating layer, and a microporous nickel plating layer in this order; and a black chromium plating layer formed of trivalent chromium on the nickel plating layer. Although a corrosion-resistant film is preferably formed on the black chromium plating layer, each of samples 1 to 13 includes no corrosion-resistant film.

In order to produce a black plated resin part, firstly, the surface of a resin substrate was subjected to pretreatment for imparting conductivity to the surface. In the pretreatment, an ABS resin substrate was immersed in chromic acid for etching, and a Pd—Sn metal complex was applied to the etched surface for activation thereof, followed by formation of an electroless nickel plating layer serving as a conductive layer.

Subsequently, the resin substrate endowed with conductivity by the pretreatment was subjected to underlying plating treatment. In the underlying plating treatment, the resin substrate was subjected to electroplating in various metal plating baths so as to form, on the resin substrate, a copper plating layer, a semigloss nickel plating layer, a gloss nickel plating layer, and a microporous nickel plating layer in this order.

Subsequently, the underlying plated resin substrate was subjected to black chromium plating. In the black chromium plating, the underlying plated resin substrate was immersed in a trivalent chromium plating bath and electroplated under the following conditions: a bath temperature of 40° C., a pH of 3.2, a predetermined cathode current density, a predetermined anode current density, and a plating time of five minutes, to thereby form a black chromium plating layer having a predetermined thickness on the microporous nickel plating layer. The trivalent chromium plating bath used for the black chromium plating was an aqueous solution containing the following components (the trivalent chromium compound was basic chromium sulfate contained in Trichrome Additive). The pH was adjusted to 3.2 with 35% hydrochloric acid.

Boric acid manufactured by Wako Pure Chemical Industries, Ltd.: 63 g/L
Trichrome Additive manufactured by Atotech: 400 g/L
Trichrome Stabilizer manufactured by Atotech: 100 ml/L
Trichrome Regulator manufactured by Atotech: 3 ml/L
Trichrome Corrector manufactured by Atotech: 2 ml/L
Trichrome Graphite Makeup manufactured by Atotech: 100 ml/L
Trichrome Graphite Maintenance manufactured by Atotech: predetermined amount

[Different Items of Samples 1 to 13]

(1) In the aforementioned black chromium plating, the amount of Trichrome Graphite Maintenance manufactured by Atotech (hereinafter referred to as "agent M") was adjusted as follows: 20 ml/L in samples 1 to 4 and 30 ml/L in samples 5 to 13.

(2) The cathode current density and the anode current density were adjusted to 5 A/dm$^2$ ("Middle" in Table 1) in Samples 9 and 12, 2.5 A/dm$^2$ ("Low" in Table 1) in samples 8 and 11, and 10 A/dm$^2$ ("High" in Table 1) in samples 1 to 7, 10, and 13.

Based on these differences in current density, the thickness of the black chromium plating layer was adjusted to 0.53 μm in samples 9 and 12, 0.252 μm in samples 8 and 11, and 1.10 μm in samples 1 to 7, 10, and 13.

(3) After the aforementioned black chromium plating, the samples were placed under the following different conditions before the analysis and color measurement of the black chromium plating layer. Specifically, the analysis and color measurement were performed immediately after the plating in samples 8 to 10; after storage under vacuum (at room temperature for 18 days) in samples 2 and 5; after being allowed to stand in air (at room temperature for 18 days) in samples 3 and 6; and after an acceleration test (i.e., the samples were allowed to stand still for a predetermined time in a thermostatic chamber in air at a temperature of 80° C. under a change in humidity between 20% and 80% in three hours/cycle) in samples 1, 4, 7, and 11 to 13. The predetermined time of the acceleration test was 90 days for sample 1 and 18 days for samples 4, 7, and 11 to 13.

The black chromium plating layer of each of the black plated resin parts (samples 1 to 13) prepared above was subjected to analysis and color measurement as follows.

<Analysis of Black Chromium Plating Layer>

The black chromium plating layer was subjected to hard X-ray photoemission spectroscopy (HAXPES) analysis with the following apparatus.

Beamline: Large synchrotron radiation facility SPring-8 BL16XU (photon energy: 7947.58 eV)

Analyzer: R4000 available from VG Scienta (Take-off angle: 85°)

Peak resolution was performed with reference to M. C. Biesinger, et al., Appl. Surf. Sci. 257, 2717 (2011) (oxide: one broad peak). The results of Cr2p peak resolution demonstrated the following in all samples.

The chromium in the black chromium plating layer is present in the form of metallic chromium (Cr), chromium oxide ($Cr_2O_3$), and chromium hydroxide ($Cr(OH)_3$).

The compositional proportions of metallic chromium, chromium oxide, and chromium hydroxide are different between the interior of the black chromium plating layer and a surface region thereof. The surface region corresponds to a region having a depth of about 10 to several tens of nanometers as measured from the surface of the black chromium plating layer, and the surface region is considered as a surface-modified layer (also considered as a surface-modified layer in samples 8 to 10 immediately after the plating).

The thickness of the surface-modified layer was calculated (in terms of $Cr_2O_3/Cr$) according to B. R. Storhmeier, Surf. Interface Anal. 15, 51 (1990).

Table 1 shows the above-measured thickness of the surface-modified layer and the compositional proportions of metallic chromium, chromium oxide, and chromium hydroxide. Table 1 also shows the values (b+c)/a and c/b wherein a, b, and c represent the proportions of metallic chromium, chromium oxide, and chromium hydroxide, respectively.

<Color Measurement>

The color (the L*a*b* color system) of the black chromium plating layer was measured from the surface region side with a spectrophotometric colorimeter (CM-700d, manufactured by KONICA MINOLTA, INC.) under the following measurement conditions: measuring mode: SCI, observation condition: 10° visual field, observation light source: D65, and measurement diameter/illumination diameter: ϕ3/ϕ6. Table 1 shows measured values based on the L*a*b* color system.

The results of measurement shown in Table 1 demonstrate the following.

(1) The larger the amount of agent M added, the larger the thickness of the surface-modified layer.

(2) The higher the current density, the larger the thickness of the surface-modified layer.

(3) A change in the condition after the black chromium plating (i.e., storage under vacuum allowed to stand in air acceleration test) results in an increase in the thickness of the surface-modified layer, a decrease in the proportion of metallic chromium a, and an increase in the sum of the proportions of chromium oxide and chromium hydroxide (b+c).

Figure 2:
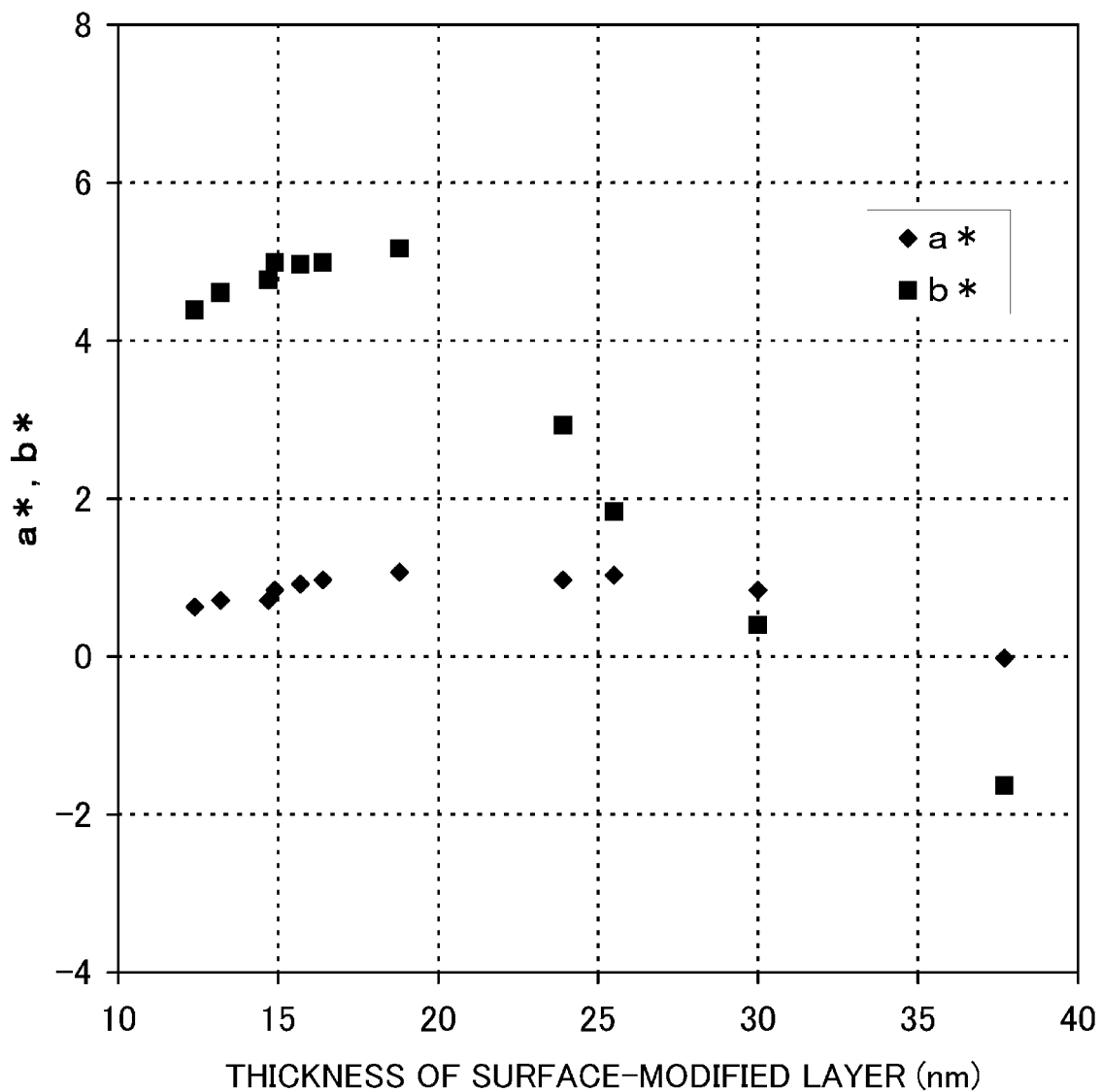
FIG. 2 is a graph showing the relationship between the thickness of a surface-modified layer and a* value or b* value in black chromium plating layers of samples 1 to 13.

(4) FIG. 2 shows the plotting of a* and b* values against the thickness of the surface-modified layer in samples 1 to 13. As shown in FIG. 2, the thickness of the surface-modified layer strongly correlates with the b* value, and the b* value drastically decreases within a thickness range of 20 to 25 nm.

In samples 2, 3, 5, 6, and 8 to 12, the black chromium plating layer exhibits a b* value of more than 3.0 and has a yellowish tone. Thus, these samples are regarded as Comparative Examples.

In samples 1, 4, 7, and 13, the black chromium plating layer exhibits a b* value of 3.0 or less and has no yellowish tone. However, these samples are regarded as Comparative Examples.

Subsequently, samples 14 to 21, which have main differences shown in Table 2, were prepared as black plated resin parts shown in FIG. 1. The black chromium plating layer of each sample was subjected to color measurement.

TABLE 2

| Sample No. | Amount of thiocyanic acid contained in plating bath | Color change with elapse of warm water immersion time ||||||||||||||
|---|---|---|---|---|---|---|---|---|---|---|---|---|---|---|---|
| | | Initial ||| 10 minutes ||| 30 minutes ||| 60 minutes ||| 120 minutes |||
| | | L | a | b | L | a | b | L | a | b | L | a | b | L | a | b |
| 14 | 15 g/L | 47.84 | 0.99 | 5.84 | 38.25 | 2.13 | 0.98 | 37.5 | 1.62 | −0.48 | 37.3 | 0.67 | −3.91 | 37.24 | 0.56 | −4.91 |
| 15 | 20 g/L | 47.67 | 0.88 | 5.87 | 39.25 | 1.88 | 0.66 | 37.21 | 1.23 | −1.11 | 37.21 | −1 | −4.11 | 38.12 | −1.11 | −5.1 |
| 16 | 30 g/L | 46.86 | 1.28 | 5.62 | 37.65 | 0.78 | −0.27 | 38.64 | −1.36 | −4.16 | 38.45 | −1.57 | −6.22 | 38.11 | −1.59 | −6.23 |
| 17 | 40 g/L | 45.73 | 1.15 | 6.18 | 36.45 | 1.02 | −3.61 | 37.25 | −0.33 | −6 | 38.78 | −2.27 | −6.02 | 39.81 | −2.76 | −6.29 |
| 18 | 50 g/L | 43.25 | 1.21 | 6.07 | 38.12 | 0.11 | −3.31 | 39.39 | −0.95 | −4.25 | 41.56 | −3.43 | −5.71 | 41.25 | −1.9 | −4.24 |
| 19 | 60 g/L | 41.52 | 1.45 | 6.07 | 41.68 | −3.66 | −5.83 | 40.12 | −3.76 | −6.12 | 40.51 | −3.88 | −6.02 | 41.2 | −3.9 | −5.71 |
| 20 | 70 g/L | 43.1 | 2.23 | 6.32 | 41.9 | −4.34 | −5.41 | 40.78 | −4.58 | −6.08 | 41.02 | −4.88 | −5.78 | 41.2 | −4.48 | −5.61 |
| 21 | 100 g/L | 39.86 | 1.7 | 5.96 | 44.47 | −4.76 | −2.12 | 43.2 | −5.12 | −1.48 | — | — | — | — | — | — |

As shown in FIG. 1, each of the black plated resin parts of samples 14 to 21 has the same layer configuration as in samples 1 to 13. Although a corrosion-resistant film is preferably formed on the black chromium plating layer, each of samples 14 to 21 includes no corrosion-resistant film.

In order to produce a black plated resin part, the surface of a resin substrate was subjected to pretreatment in the same manner as in samples 1 to 13.

Subsequently, the resin substrate endowed with conductivity by the pretreatment was subjected to underlying plating treatment in the same manner as in samples 1 to 13.

Subsequently, the underlying plated resin substrate was subjected to black chromium plating. In the black chromium plating, the underlying plated resin substrate was immersed in a trivalent chromium plating bath and electroplated under the following conditions: a bath temperature of 25° C., a pH of 3.5, a cathode current density of 10 A/dm$^2$, an anode current density of 10 A/dm$^2$, and a plating time of 2.5 minutes, to thereby form a black chromium plating layer having a predetermined thickness of 0.55 μm on the microporous nickel plating layer. The trivalent chromium plating bath used for the black chromium plating was an aqueous solution containing the following components (the trivalent chromium compound was basic chromium sulfate contained in Trichrome Additive). The pH was adjusted to 3.5 with 35% hydrochloric acid.

Boric acid manufactured by Wako Pure Chemical Industries, Ltd.: 10 g/L
Trichrome Additive manufactured by Atotech: 400 g/L
Trichrome Stabilizer manufactured by Atotech: 90 ml/L
Trichrome Regulator manufactured by Atotech: 1.0 ml/L
Trichrome Corrector manufactured by Atotech: 4.5 ml/L
Trichrome Graphite Makeup manufactured by Atotech: 110 ml/L
Thiocyanic acid (commercially available reagent): predetermined amount (described below)

Trichrome Graphite Makeup and Trichrome Graphite Maintenance incorporated in samples 1 to 13 were found to contain thiocyanic acid (and additional components).

Thus, in samples 14 to 21, thiocyanic acid (commercially available reagent) was incorporated instead of Trichrome Graphite Maintenance, and the amount of thiocyanic acid (commercially available reagent) was adjusted so that the entire amount of thiocyanic acid (derived from Trichrome Graphite Makeup and commercially available thiocyanic acid) in the trivalent chromium plating bath was as shown in Table 2 for samples 14 to 21.

Subsequently, the resin substrate provided with the black chromium plating layer of each of samples 14 to 21 was immersed in warm water (distilled water) at 80° C. The color (the L*a*b* color system) of the black chromium plating layer of each of samples 14 to 21 was measured in the same manner as in samples 1 to 13 before the immersion (initial) and 10 minutes, 30 minutes, 60 minutes, and 120 minutes after the immersion. The results of measurement are shown in Table 2.

The HAXPES analysis performed on samples 1 to 13 was not performed on samples 14 to 21. However, it is clear that at least the chromium in the black chromium plating layer is present in the form of metallic chromium (Cr), chromium oxide ($Cr_2O_3$), and chromium hydroxide ($Cr(OH)_3$), and the black chromium plating layer includes a surface-modified layer, as determined from the common items between samples 1 to 13 and samples 14 to 21.

The results of measurement shown in Table 2 demonstrate the following.

Figure 3:
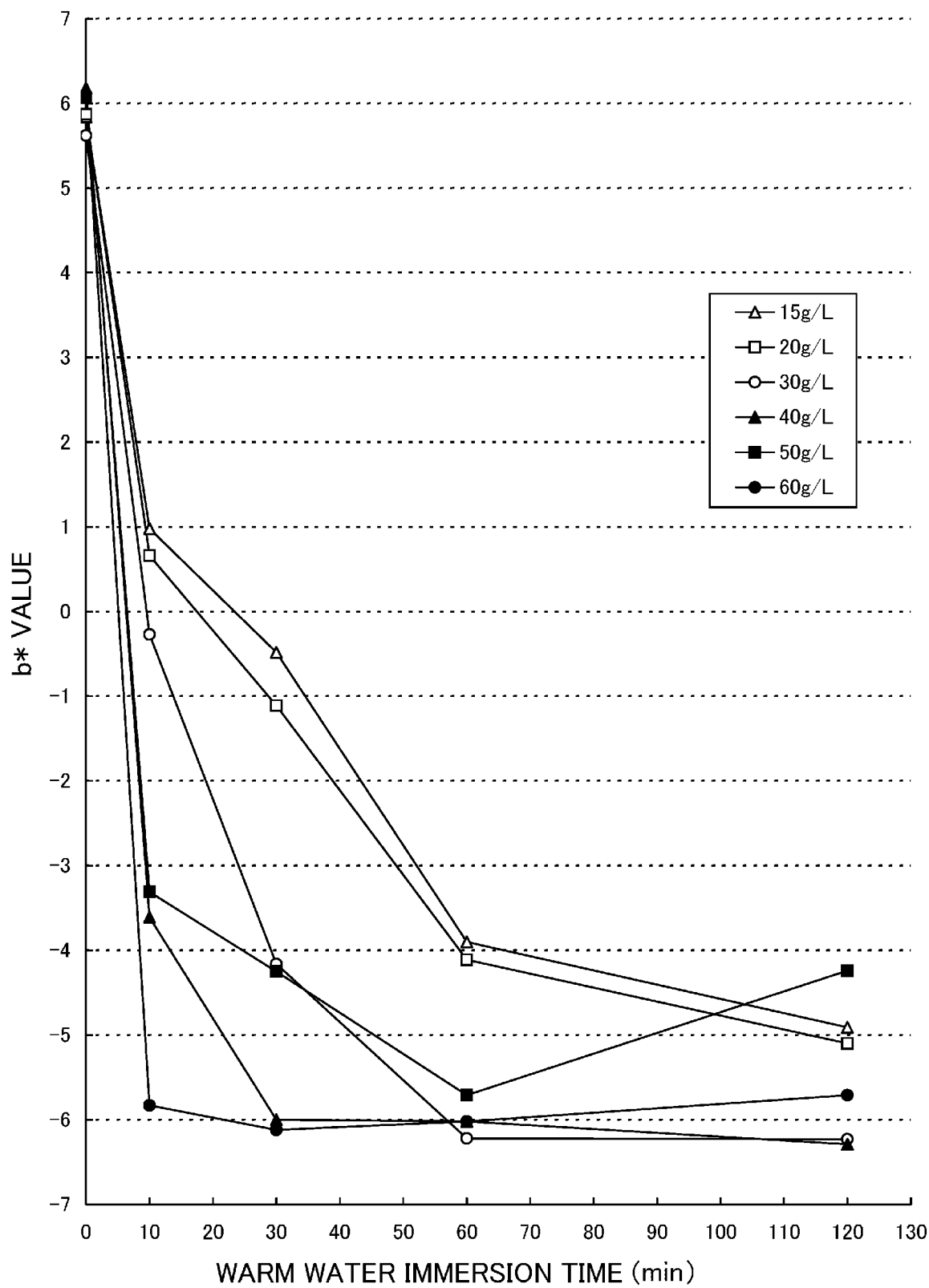
FIG. 3 is a graph showing the relationship between warm water immersion time and b* value in black chromium plating layers of samples 14 to 21.

(1) FIG. 3 shows the plotting of b* values against the warm water immersion time in samples 14 to 21 with different thiocyanic acid contents during plating. The longer the warm water immersion time, the smaller the b* value. An increase in thiocyanic acid content during plating leads to a decrease in b* value within a short warm water immersion time.

(2) In samples 14 to 21, the b* value is reduced to 3.0 or less by the warm water immersion treatment. As shown in regions surrounded by thick lines in Table 2, the b* value can be reduced to −1.7 or less through control of the warm water immersion time, to thereby achieve a bluish black color. The samples exhibiting a b* value of −1.7 or less by the warm water immersion treatment are regarded as Examples.

The present invention is not limited to the aforementioned examples, and may be appropriately modified and embodied without departing from the spirit of the invention.

The invention claimed is:

1. A method for producing a black plated resin part, comprising the steps of:
electroplating a resin substrate provided with an underlying plating layer in a trivalent chromium plating bath containing thiocyanic acid, to thereby form, on the underlying plating layer, a black chromium plating layer composed of trivalent chromium and having a thickness of 0.15 μm or more; and
immersing the resin substrate provided with the black chromium plating layer in warm water at 30° C. or higher for a predetermined time, wherein
the amount of thiocyanic acid contained in the trivalent chromium plating bath, the temperature of the warm water, and the time of immersion of the resin substrate in the warm water are adjusted so that the black chromium plating layer exhibits a b* value of −1.7 or less based on the L*a*b* color system, and
the trivalent chromium in the black chromium plating layer is present as metallic chromium, chromium oxide, and chromium hydroxide.

2. The method according to claim 1, wherein, in a surface region of the black chromium plating layer having a depth of at least 23 nm as measured from the surface of the black chromium plating layer, the compositional proportions of metallic chromium, chromium oxide, and chromium hydroxide satisfy the following relations: b+c>4a and c>0.8b wherein a, b, and c represent the compositional proportions of metallic chromium, chromium oxide, and chromium hydroxide, respectively (note: a>0, b>0, and c>0).

* * * * *